(12) United States Patent
Lee

(10) Patent No.: US 8,307,150 B2
(45) Date of Patent: Nov. 6, 2012

(54) APPARATUS AND METHOD FOR MANAGING MEMORY

(75) Inventor: Jae Don Lee, Paju-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 582 days.

(21) Appl. No.: 12/483,027

(22) Filed: Jun. 11, 2009

(65) Prior Publication Data

US 2010/0199023 A1 Aug. 5, 2010

(30) Foreign Application Priority Data

Jan. 30, 2009 (KR) .................. 10-2009-0007249

(51) Int. Cl.
*G06F 13/00* (2006.01)
*G06F 13/28* (2006.01)
(52) U.S. Cl. ............... 711/103; 711/E12.008; 713/1
(58) Field of Classification Search ............ 711/103, 711/E12.008; 713/1
See application file for complete search history.

(56) References Cited

U.S. PATENT DOCUMENTS

| 2003/0227451 | A1* | 12/2003 | Chang ................. 345/211 |
| 2007/0011395 | A1* | 1/2007 | Kim .................... 711/103 |
| 2007/0266200 | A1* | 11/2007 | Gorobets et al. ....... 711/103 |
| 2007/0283085 | A1* | 12/2007 | Lin .................... 711/112 |
| 2008/0082726 | A1* | 4/2008 | Elhamias .............. 711/103 |
| 2008/0320214 | A1* | 12/2008 | Ma et al. .............. 711/103 |
| 2010/0115185 | A1* | 5/2010 | Ono et al. ............. 711/103 |

FOREIGN PATENT DOCUMENTS

| JP | 2003-323466 | 12/2007 |
| JP | 2008-140238 | 6/2008 |
| KR | 10-2001-0058463 | 7/2001 |
| KR | 10-2006-0007667 | 1/2006 |

* cited by examiner

Primary Examiner — Edward Dudek, Jr.
(74) Attorney, Agent, or Firm — NSIP Law

(57) ABSTRACT

A memory management method and apparatus are disclosed. The memory management apparatus may compute a remaining storage capacity of a flash memory based on a number of bad blocks in a flash memory or a number of block-erases of each of a plurality of blocks, and may display the computed remaining storage capacity of the flash memory.

9 Claims, 6 Drawing Sheets

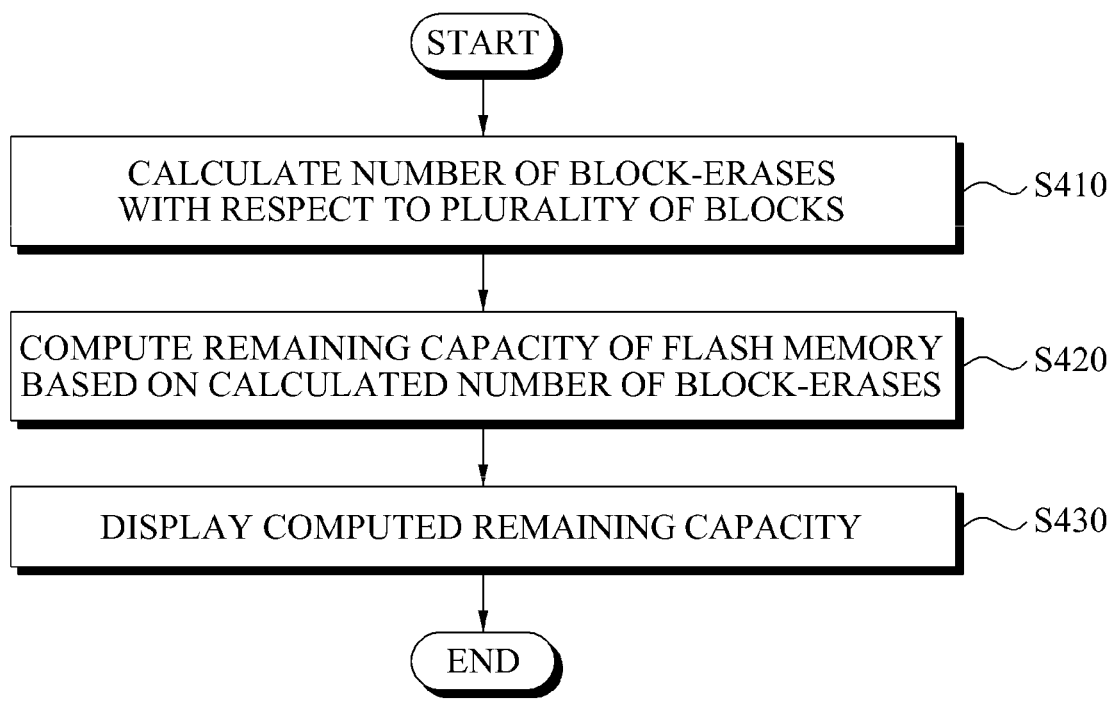

APPARATUS AND METHOD FOR MANAGING MEMORY

CROSS-REFERENCE TO RELATED APPLICATION(S)

This application claims the benefit under 35 U.S.C. §119 (a) of a Korean Patent Application No. 10-2009-0007249, filed on Jan. 30, 2009, in the Korean Intellectual Property Office, the entire disclosure of which is incorporated herein by reference for all purposes.

BACKGROUND

1. Field

The following description relates to an apparatus and a method of managing a memory device, and more particularly, to an apparatus and a method that may manage a remaining storage capacity of the memory device.

2. Description of Related Art

Examples of a storage device to store data include a magnetic disk, a semiconductor device, and the like. Since physical characteristics are different for each type of storage device, a management method corresponding to the physical characteristic is needed.

A conventional magnetic disk is widely used to store data. A read/write time of the magnetic disk usually takes an average of several milliseconds per kilobyte. Also, the read/write time of the magnetic disk varies, since arrival moving time of an arm is different depending on a physical location of where data is stored on the magnetic disc.

A conventional non-volatile memory device takes a relatively short read/write time, consumes a small amount of power, and occupies a small amount of space, as compared to the magnetic disk. Furthermore, since the non-volatile memory device now has an increased storage capacity, non-volatile memory devices have become more readily used than magnetic disks. A flash memory is a representative example of the non-volatile memory device.

The non-volatile memory device is able to electrically read data, write data, and erase data, and the non-volatile memory device is a semiconductor device that is able to maintain stored data even where power is cut off. A process of storing data in the non-volatile memory device may be referred to as programming as well as writing.

SUMMARY

In one general aspect, there is provided a memory management apparatus including a calculating unit to calculate a number of bad blocks and a number of reserved blocks in a flash memory, a computing unit to compute a remaining storage capacity of the flash memory based on the number of bad blocks and the number of reserved blocks, and a display unit to display the computed remaining storage capacity.

The computing unit may compute the remaining storage capacity based on a ratio of the number of bad blocks and the number of reserved blocks.

The display unit may display the remaining storage capacity in a level gauge format.

The apparatus may further include an alarm unit to enable a warning lamp to be operated or to output an alarm sound, in response to the remaining storage capacity being less than a threshold capacity.

In another general aspect, there is provided a memory management apparatus, including a calculating unit to calculate a number of block-erases with respect to a plurality of blocks in a flash memory, a computing unit to compute a remaining storage capacity of the flash memory based on the calculated number of block-erases, and a display unit to display the computed remaining storage capacity.

The computing unit may calculate an average number of block erases based on the number of the block-erases with respect to the plurality of blocks, and may compute the remaining storage capacity by comparing the average number of block erases with a maximum probable number of block-erases with respect to the plurality of the blocks.

The display unit may display the remaining storage capacity in a level gauge format.

The apparatus may further include an alarm unit to enable a warning lamp to be operated or to output an alarm sound, in response to the remaining storage capacity being less than a threshold capacity.

In yet another general aspect, there is provided a memory management method of a memory management apparatus, including calculating a number of bad blocks and a number of reserved blocks in a flash memory, computing a remaining storage capacity of the flash memory based on the number of bad blocks and the number of reserved blocks, and displaying the computed remaining storage capacity.

The displaying of the computed remaining storage capacity may include displaying the remaining capacity in a level gauge format.

In a further general aspect, there is provided a computer-readable storage medium storing a program to perform memory management, comprising instructions to cause a computer to calculate a number of bad blocks and a number of reserved blocks in a flash memory, compute a remaining storage capacity of the flash memory based on the number of bad blocks and the number of reserved blocks, and display the computed remaining storage capacity.

Other features and aspects will be apparent from the following detailed description, the drawings, and the claims.

BRIEF DESCRIPTION OF THE DRAWINGS

FIG. 4 is a flowchart illustrating another example of a memory management method.

Figure 1:
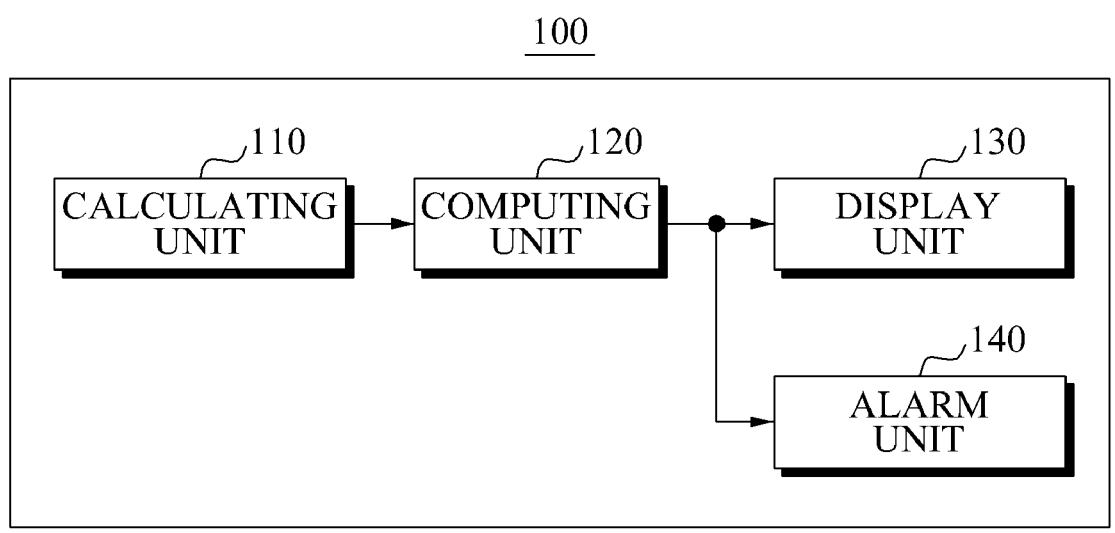
FIG. 1 is a block diagram illustrating an example of a detailed configuration of a memory management apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an exemplary memory management apparatus 100.

The memory management apparatus 100 includes a calculating unit 110, a computing unit 120, and a display unit 130. The memory management apparatus 100 may further include an alarm unit 140. Hereinafter, an operation corresponding to each element above will be described.

Also, according to one aspect, the memory management apparatus 100 calculating a remaining storage capacity of a flash memory based on a number of bad blocks and a number of reserved blocks in the flash memory will be described below.

The calculating unit 110 calculates the number of bad blocks and the reserved blocks in the flash memory.

The flash memory may be, for example, a NAND flash memory.

A block is a standard unit to read, write, or erase data in the flash memory. That is, reading, writing, or erasing of data in the flash memory may be performed by a block unit, as opposed to being performed by a byte unit.

A bad block that is not able to read and/or write data may exist in the flash memory. The bad block may be generated during a manufacturing process of the flash memory, or may be generated during writing and/or erasing data with respect to a normal block. In general, a life-span of flash memory is limited. For example, a single level cell (SLC)-based flash memory may have a high probability of generating the bad block due to deterioration of the flash memory due to time, after performing writing and/or erasing operations over 100,000 times, and a multi level cell (MLC)-based flash memory may have a high probability of generating the bad block after performing the writing and/or erasing operations over 10,000 times.

A reserved block is a block reserved in the flash memory which can be substituted for the generated bad block. After the bad block is generated, the flash memory may write the data on the reserved block instead of writing the data on the bad block.

With respect to the bad block which is generated when the flash memory is generated, a device standard indicates information that the generated block is a bad block to prevent the bad block from being used, and thus, the calculating unit 110 may calculate a number of bad blocks generated due to old age of the flash memory, and a number of reserved blocks remaining.

The computing unit 120 computes the remaining storage capacity of the flash memory based on the calculated number of bad blocks and the number of reserved blocks.

As described above, as the number of bad blocks increases in the flash memory, the number of reserved blocks further decreases and the remaining storage capacity, namely, a remaining life, of the flash memory is further reduced. Accordingly, the computing unit 120 may calculate the remaining storage capacity of the flash memory based on the number of bad blocks and the number of remaining blocks.

The computing unit 120 may compute the remaining storage capacity of the flash memory based on, for example, a ratio of the number of bad blocks and the number of reserved blocks.

As an example, where information about unavailability is indicated with the bad block generated while the flash memory is generated, it may be assumed that the bad block does not exist in the generated flash memory, and only the reserved block exists. Accordingly, the remaining storage capacity may be represented as 100%. Subsequently, where the bad block is generated while the flash memory is used, the number of bad blocks increases and the number of reserved blocks decreases. Accordingly, the computing unit 120 may calculate the remaining storage capacity based on the ratio of the number of bad blocks and the number of reserved blocks.

As another example, the computing unit 120 may set a difference between a number of reserved blocks and a number of bad blocks in the generated flash memory to 100%, and may compute a remaining storage capacity using the difference between the number of reserved blocks and the number of bad blocks as a parameter.

The display unit 130 displays the remaining storage capacity computed from the computing unit 120.

For example, the display unit 130 may display the remaining storage capacity of the flash memory in a level gauge format.

As an illustration, the level gauge may be a bar-shape or an analog clock-shape.

In the case where the level gauge is the bar-shape, the display unit 130 may display the remaining storage capacity of the flash memory using, for example, a light-emitting diode (LED), a luminescent diode, and the like.

Also, the remaining storage capacity of the flash memory displayed in the level gauge format may be a currently used storage capacity compared with a total available storage capacity. That is, the display unit 130 may assume that the total available storage capacity is 100, and may display the remaining storage capacity as a percentage.

As described above, the exemplary memory management apparatus 100 informs a user of the remaining storage capacity of the flash memory through the display unit 130, and thus enables the user to check the remaining capacity in real time. Accordingly, management of the flash memory is simplified, and storage stability and reliability with respect to the memory device is improved.

As described above, in another implementation, the memory management apparatus 100 may further include the alarm unit 140.

The alarm unit 140 may enable a warning lamp to be operated or output an alarm sound, where the remaining storage capacity is less than a threshold capacity.

The threshold capacity may be predefined when the flash memory is generated.

Where the remaining storage capacity becomes excessively less than a storage capacity of when the flash memory is generated, for example, where the remaining storage capacity is within 5% of the total available storage capacity, a manufacturer of the flash memory may set this capacity as the threshold capacity. Accordingly, the user may recognize that the remaining storage capacity of the flash memory is small, through the warning lamp or the alarm sound.

Hereinafter, a case in which the memory management apparatus 100 calculates the remaining storage capacity of the flash memory based on a number of block-erases with respect to a plurality of blocks in the flash memory will be described.

The calculating unit 110 calculates the number of block-erases with respect to the plurality of blocks in the flash memory.

The computing unit 120 computes the remaining storage capacity of the flash memory based on the calculated number of block-erases.

Here, block-erasing may be an operation corresponding to an operation of writing of data on a block. That is, as a number of operations that writes data to the block increases, a number of block-erases with respect to the block further increases.

As described above, since the more the writing and/or erasing operation is performed, the more a probability of generating a bad block increases, the number of block-erases may be inverse proportional to the remaining storage capacity of the flash memory.

According to another aspect, the memory management apparatus 100 may calculate the number of block-erases with respect to the plurality of blocks in the flash memory, and may calculate the remaining storage capacity of the flash memory based on the calculated number of block erases.

The computing unit 120 may calculate an average number of block-erases based on the number of block-erases with respect to the plurality of blocks, and may compute the remaining storage capacity of the flash memory by comparing the average number of block-erases with a maximum probable number of block-erases with respect to the plurality of blocks.

That is, the computing unit 120 sums up all calculated number of block-erases with respect to the plurality of blocks, and divides the total sum by a number of the plurality of blocks to obtain the average number of block-erases. Subsequently, the computing unit 120 calculates the remaining storage capacity of the flash memory by comparing the average number of block-erases with the maximum probable number of block-erases that is a maximum probable number of operations of writing data on each block and erases data from each block.

The remaining storage capacity calculated from the computing unit 120 is displayed by the display unit 130.

As described above, the display unit 130 may display the remaining storage capacity in a level gauge format.

For example, where the computing unit 130 displays the remaining storage capacity of the flash memory using a bar-shape level gauge, assuming that writing and/or erasing operation with respect to a block is able to be performed 100,000 times and the number of the average block-erases is 50,000, half of the bar-shape level gauge may be filled.

Also, as described above, the memory management apparatus 100 may enable a warning lamp to be operated or output an alarm sound through the alarm unit 140.

Figure 2A:
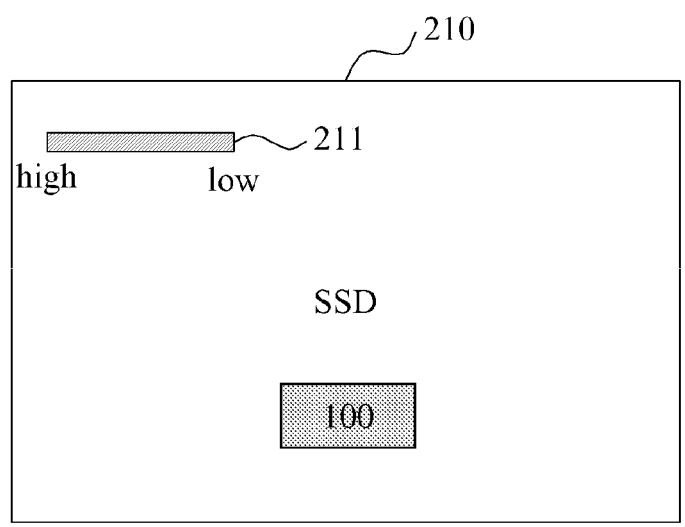
FIGS. 2A through 2C illustrate examples of a memory device having a memory management apparatus.
Figure 2B:
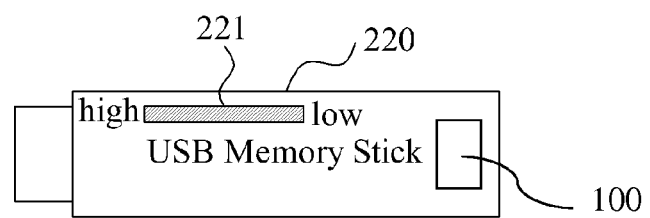
Figure 2C:
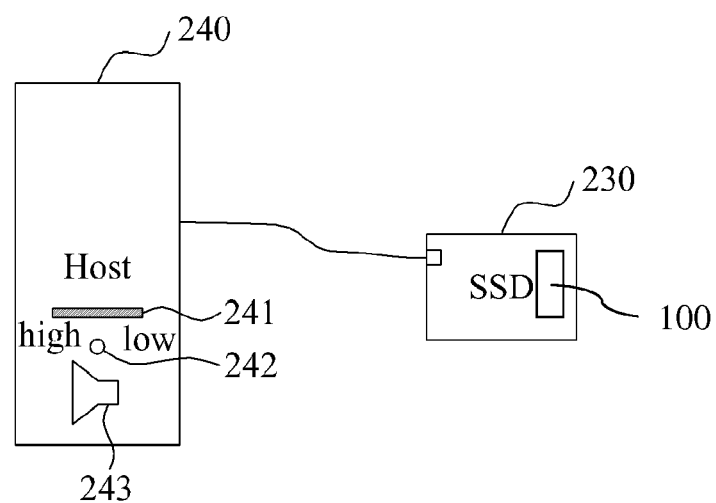

FIGS. 2A through 2C illustrate exemplary memory devices having a memory management apparatus described above.

FIG. 2A illustrates a solid state drive (SSD) 210 having the memory management unit 100, and FIG. 2B illustrates a universal serial bus (USB) memory stick 220 having the memory management apparatus 100. A bar-shape level gauge 211 or 221 is externally provided to the SSD 210/USB memory stick 220, as the display unit 130.

The SSD 210 is a memory device constituted by a plurality of flash memory chips, a bus controller, and a memory buffering a request of a host system. A time utilized corresponding to the SSD 210 to perform reading and writing is asymmetric, unlike a conventional magnetic disk.

As illustrated in FIGS. 2A and 2B, a user may recognize the remaining storage capacity, namely, a remaining life, of the SSD 210 or the USB memory stick 220 through the level gauge 211 or 221 externally provided to the SSD 210 or the USB memory stick 220.

FIG. 2C illustrates a computer system in which an SSD 230 having the memory management apparatus 100 and a host computer 240 are connected with each other.

Unlike FIGS. 2A and 2B, FIG. 2C illustrates a level gauge 241 which is provided to the host computer 240 in the computer system. Also, a warning lamp 242 and a speaker 243 are provided to the host computer 240.

In the computer system, where it is desired to diagnose the remaining storage capacity of the SSD 230, the host computer 240 transmits a diagnostics message to the SSD 230. The SSD 230 that receives the diagnostics message computes the remaining storage capacity and transmits the calculated remaining storage capacity to the level gauge 241.

Also, where the remaining storage capacity of the SSD is less than a threshold capacity regardless of whether the diagnose message is transmitted or not, the SSD 230 may transmit an alarm message to the host computer 240. The host computer that receives the alarm message may operate the warning lamp 242 or may output an alarm sound through the speaker 243, and thereby informing that little of the life of the SSD 230 remains.

Figure 3:
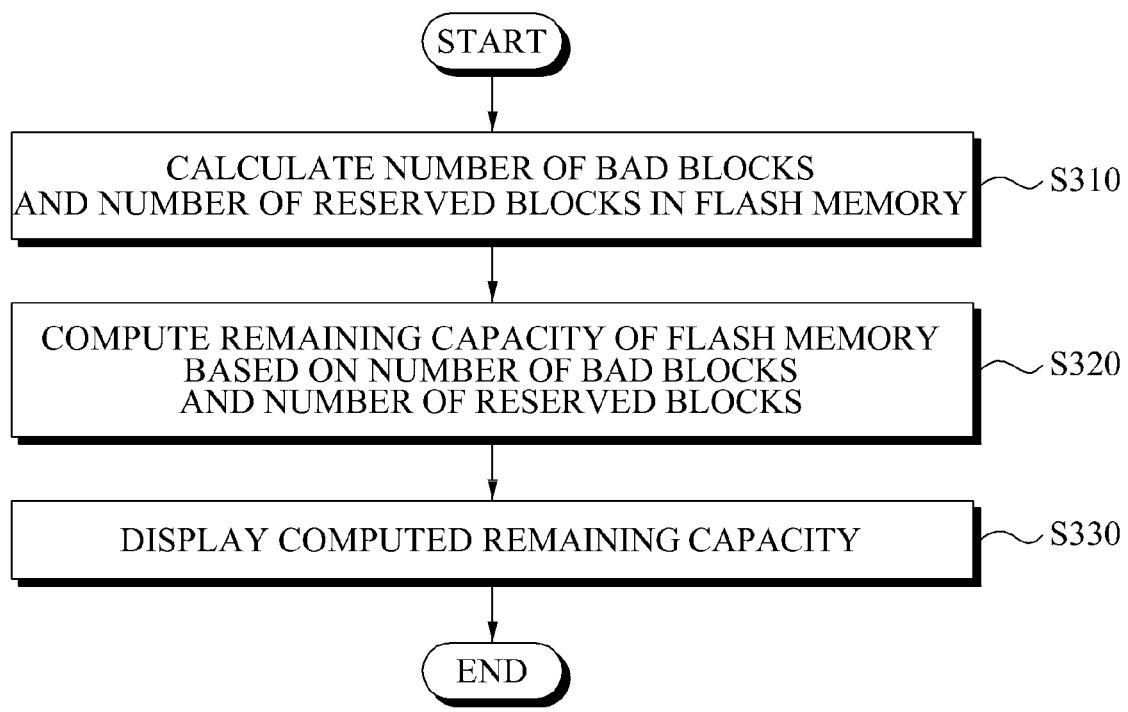
FIG. 3 is a flowchart illustrating an example of a memory management method.

FIG. 3 is a flowchart illustrating an exemplary memory management method.

A number of bad blocks and a number of reserved blocks in a flash memory are calculated in operation S310.

A remaining storage capacity of the flash memory may be computed based on the number of bad blocks and the number of reserved blocks in operation S320.

For example, the remaining storage capacity of the flash memory may be computed based on a ratio of the number of bad blocks and the number of reserved blocks in operation S320.

The remaining storage capacity computed in operation S320 is displayed in operation 330.

For example, the remaining storage capacity of the flash memory may be displayed in a level gauge format.

The memory management method may further include enabling a warning alarm to be operated or outputting an alarm sound, where the remaining storage capacity of the flash memory is less than a threshold capacity.

FIG. 4 is a flowchart illustrating another exemplary memory management method.

A number of block-erases with respect to a plurality of blocks in a flash memory is calculated in operation S410.

In operation S420, a remaining storage capacity of the flash memory is computed based on the calculated number of block-erases.

For example, an average number of block-erases is calculated based on the number of block-erases with respect to the plurality of blocks, and the remaining storage capacity of the flash memory is computed by comparing the average number of block-erases and a maximum probable number of block-erases with respect to the plurality of blocks.

In operation S430, the remaining storage capacity computed from operation S420 is displayed.

For example, the flash memory storage capacity of the flash memory may be displayed in a level gauge format in operation S330.

The methods of FIGS. 3 and 4 may be performed by a memory management apparatus or a memory device having a memory management apparatus, as described above with respect to FIGS. 1-2C.

The memory management method according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A memory management apparatus, comprising:
   a calculating unit configured to calculate a number of bad blocks and a number of reserved blocks in a flash memory, wherein a reserved block is a block reserved in the flash memory and is substituted for a bad block in response to the bad block being generated;
   a computing unit configured to compute a remaining storage capacity of the flash memory based on the number of bad blocks and the number of reserved blocks; and
   a display unit configured to display the computed remaining storage capacity.

2. The apparatus of claim 1, wherein the display unit displays the remaining storage capacity in a level gauge format.

3. The apparatus of claim 1, further comprising:
   an alarm unit configured to enable a warning lamp to be operated or to output an alarm sound, in response to the remaining storage capacity being less than a threshold capacity.

4. The apparatus of claim 1, wherein the computing unit is configured to compute the remaining storage capacity using a difference between the number of reserved blocks and the number of bad blocks as a parameter.

5. The apparatus of claim 1, wherein the computing unit is configured to compute a remaining life of the flash memory based on the number of bad blocks and the number of reserved blocks.

6. A memory management apparatus, comprising:
   a calculating unit to calculate a number of bad blocks and a number of reserved blocks in a flash memory;
   a computing unit to compute a remaining storage capacity of the flash memory based on the number of bad blocks and the number of reserved blocks; and
   a display unit to display the computed remaining storage capacity,
   wherein the computing unit computes the remaining storage capacity based on a ratio of the number of bad blocks and the number of reserved blocks.

7. A memory management method of a memory management apparatus, the method comprising:
   calculating a number of bad blocks and a number of reserved blocks in a flash memory, wherein a reserved block is a block reserved in the flash memory and is substituted for a bad block in response to the bad block being generated;
   computing a remaining storage capacity of the flash memory based on the number of bad blocks and the number of reserved blocks; and
   displaying the computed remaining storage capacity.

8. The method of claim 7, wherein the displaying of the computed remaining storage capacity comprises displaying the remaining capacity in a level gauge format.

9. A computer-readable storage medium storing a program to perform memory management, comprising instructions to cause a computer to:
   calculate a number of bad blocks and a number of reserved blocks in a flash memory, wherein a reserved block is a block reserved in the flash memory and is substituted for a bad block in response to the bad block being generated;
   compute a remaining storage capacity of the flash memory based on the number of bad blocks and the number of reserved blocks; and
   display the computed remaining storage capacity.

\* \* \* \* \*